July 14, 1970    J. M. GOLDSTEIN    3,520,614
SPECTROPHOTOMETER AND PROCESS
Filed June 30, 1966    6 Sheets-Sheet 1
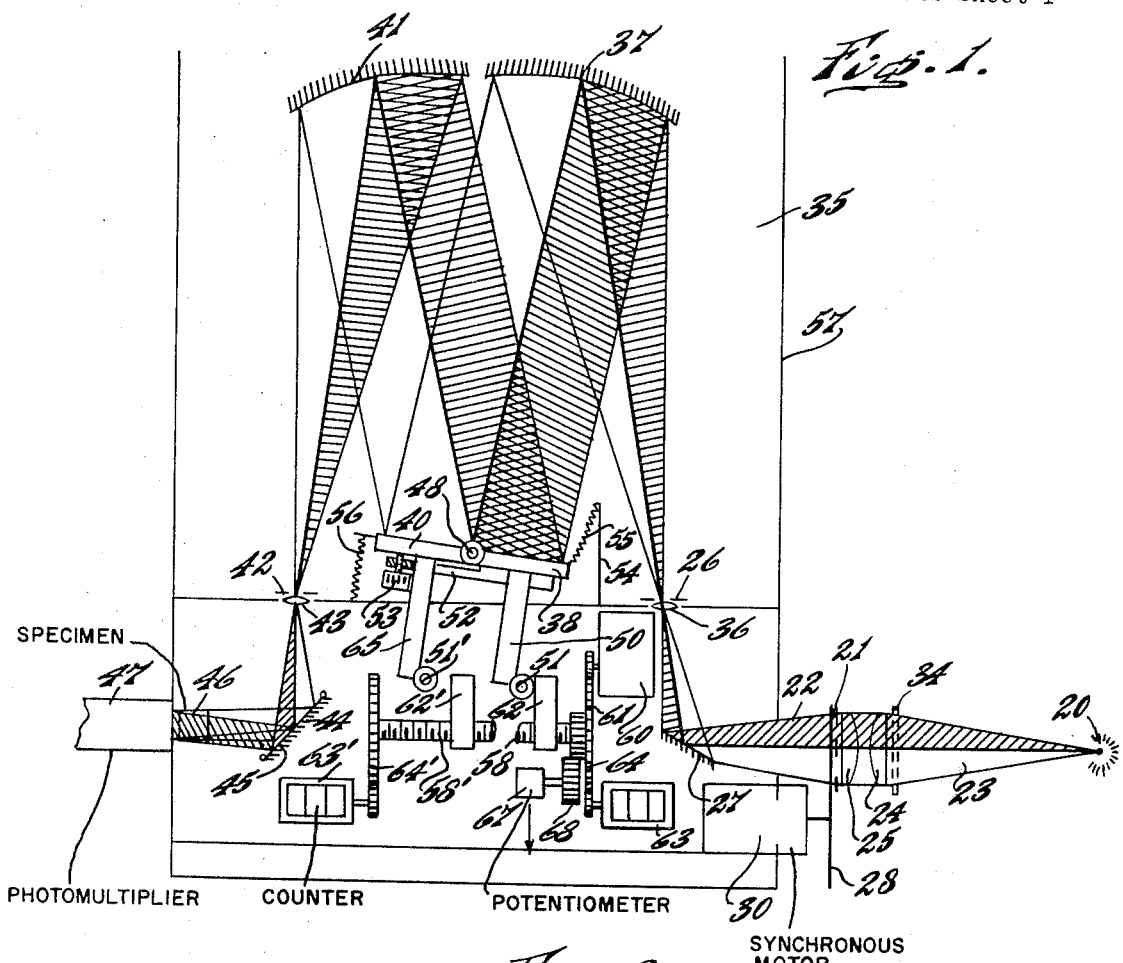
Fig. 1.
SPECIMEN
PHOTOMULTIPLIER    COUNTER    POTENTIOMETER    SYNCHRONOUS MOTOR
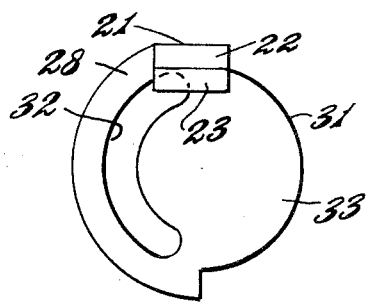
Fig. 2.
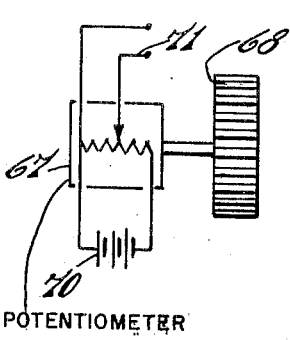
Fig. 5.
POTENTIOMETER
INVENTOR.
Jack M. Goldstein
BY
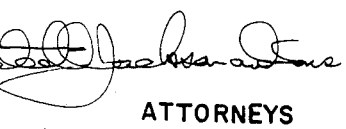
ATTORNEYS INVENTOR.
Jack M. Goldstein

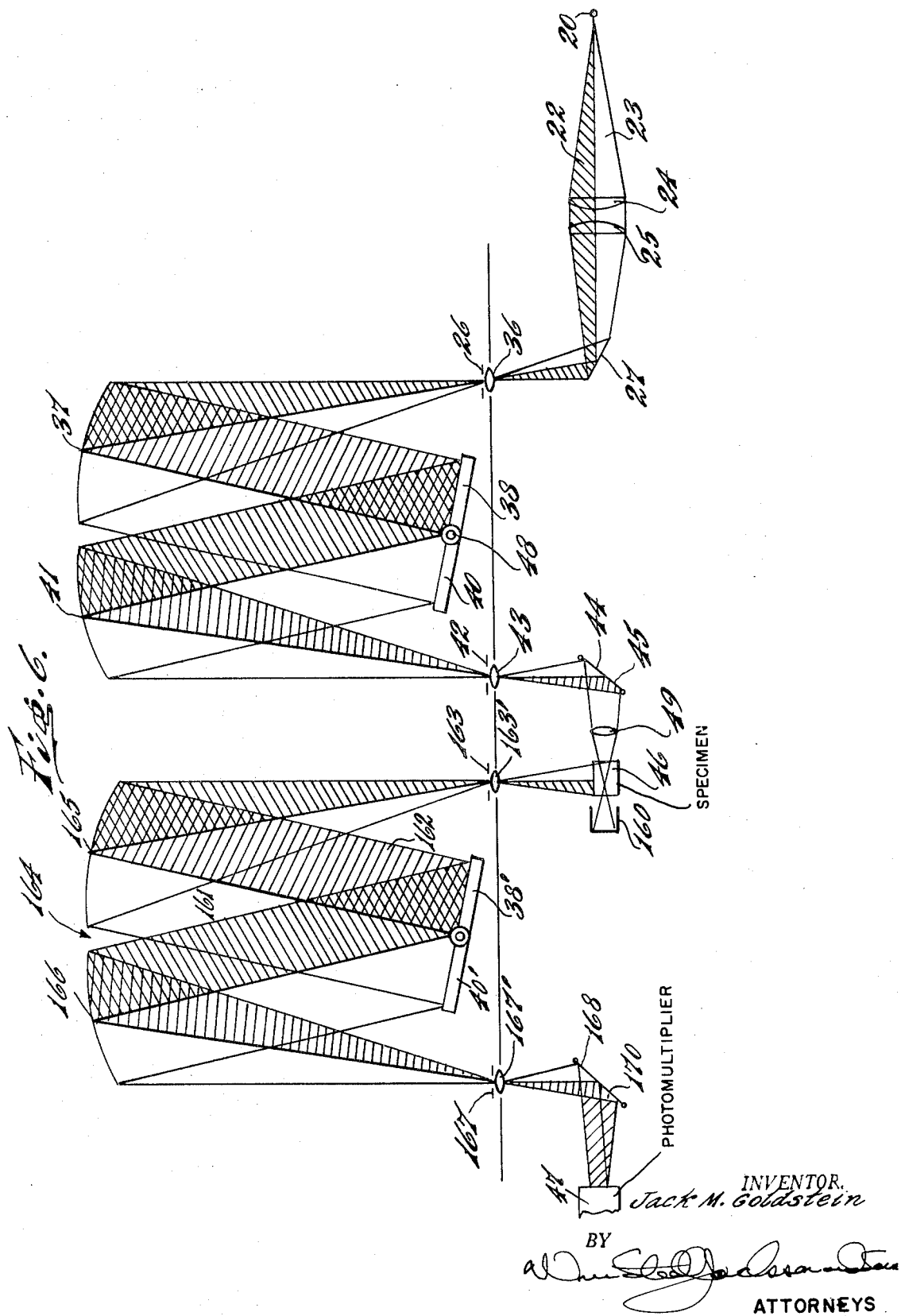

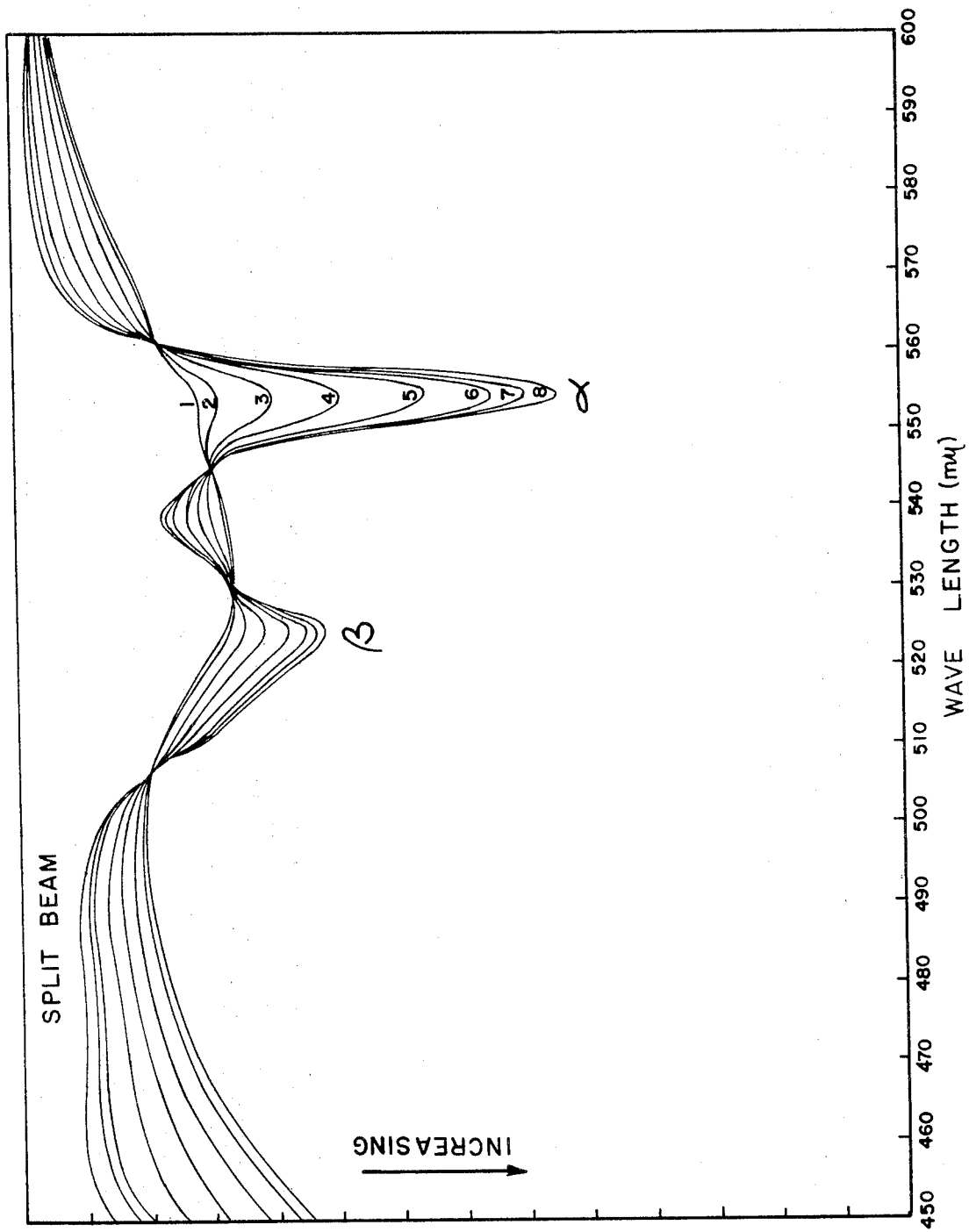

United States Patent Office  3,520,614
Patented July 14, 1970

3,520,614
SPECTROPHOTOMETER AND PROCESS
Jack M. Goldstein, Philadelphia, Pa., assignor to Phoenix Precision Instrument Co., Philadelphia, Pa., a corporation of Pennsylvania
Filed June 30, 1966, Ser. No. 561,794
Int. Cl. G01j 3/32, 3/42
U.S. Cl. 356—97                                    4 Claims

ABSTRACT OF THE DISCLOSURE

Distinctly different and novel mode of operation of a spectrophotometer in which both measure and reference beams are passed through a common specimen and which will cause accentuation of shoulders in a curve of absorbance or emission versus wavelength by changing them into peaks corresponding to a first derivative of absorbance or emission with respect to the wavelength. Unlike a previous instrument (Chance dual wave length), the wavelengths of two beams differ from one another by a fixed very small difference in wavelength of the order of 0.1 to 10 millimicrons (preferably 2 millimicrons) and the two beams scan the specimen with constantly changing wavelengths. Unlike another previous instrument (C. S. French), here both emerging beams pass through a common specimen, and the beams are constantly maintained at a different wavelength. It is important that the instrument of the invention maintain constant sensitivity by automatic correction at least once a second (usually 60 times a second) and that the absorption be converted to a logarithmic function, namely optical density.

The present invention relates to absorption and spectrophotometers and processes of absorption and spectrophotometry.

By a spectrophotometer according to the invention, it is intended to include both what are known generally as spectrophotometers and also what are sometimes called spectrophotofluorometers and what are sometimes called spectrofluorometers. The invention applies both to absorption spectrophotometers and emission spectrophotometers.

A purpose of the invention is to produce a spectrophotometer which is capable of giving absolute spectra (or a reasonable approximation thereof) without requiring any reference cuvette or sample.

A further purpose is to provide a method of spectrophotometry which is especially suitable where there is no reference sample suitable for use with a test sample.

A further purpose is to facilitate reading the curve obtained by a spectrophotometer by converting shoulders in the curve to pronounced peaks.

A further purpose is to change the mode of operation of a spectrophotometer of the general Chance or C. S. French type to make it plot the first derivative of absorbance with respect to wavelength directly in order to assist in reading the results.

A further purpose is to secure the diffraction gratings at an angular relationship so that two beams passing through the same specimen will have a difference in wavelength of 0.1 to 10 millimicrons, preferably about 2 millimicrons, and to spectrally scan the specimen by the beams, time sequentially displaced with respect to one another but having this same difference in wavelength.

Further purposes appear in the specification and in the claims.

In the drawings I have chosen to illustrate a few only of the numerous embodiments in which the invention may appear, and also examples of curves obtained by the invention.

FIG. 1 is an optical diagram of the optical elements of an absorption spectrophotometer of the invention.

FIG. 2 is an enlarged diagrammatic end elevation showing an interrupter which may be used in the device of FIG. 1.

FIG. 5 is an electrical circuit diagram showing a potentiometer circuit which may be employed.

FIG. 6 is an optical diagram of a spectrophotofluorometer to which the invention may be applied.

FIG. 7 shows curves plotting absorbance (optical density) as ordinate against wavelength in millimicrons as abscissa for cytochrome C, the results being obtained by the split beam technique. Curve 1 shows the oxidized form and curves 2 to 8 show further increments in reduction of the oxidized form shown in curve 1.

Figure 3:
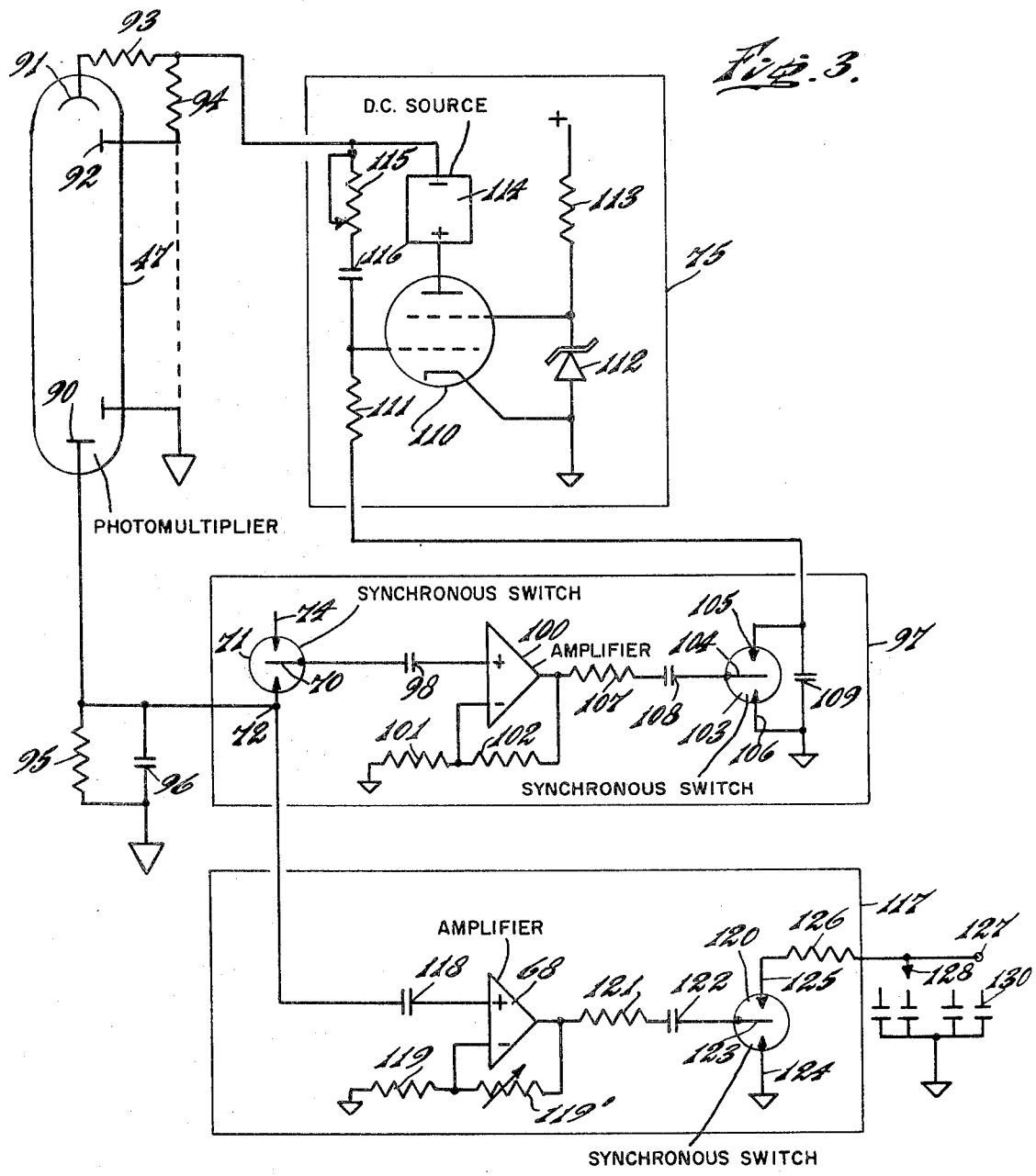
FIG. 3 is an electrical circuit diagram showing a photomultiplier, reference circuit, dynode feedback circuit and measuring circuit which may be employed in the invention.

Describing in illustration but not in limitation and referring to the drawings:

The present invention relates to the measurement of optical radiant energy absorption by a specimen. The principles of the invention are applicable to a wide range of optical radiant energy, including infrared, visible radiation, ultraviolet and far ultraviolet. While a wavelength range of 330–800 millimicrons is preferred and lower wavelengths are quite suitable with special sources, the invention can when appropriate be applied to wider spectral ranges.

In the case of absorption spectrophotometry, one important use of the invention is in studying various life processes such as enzyme kinetics. This includes the study of cytochrome systems, oxidative, phosphorylation, photosynthesis, metabolic control systems and spectra and reaction kinetics of intermediate compounds. The invention is also applicable to studies of organic and inorganic chemical compounds and in a wide variety of industrial uses, as for example in researching on pigments, paints, paper, and plastics.

It will be understood, therefore, that the invention is capable of employment in a wide variety of research and industrial activities, and is not intended to be limited to the field of life sciences.

A general type of spectrophotometer to which the invention can be applied was developed by Dr. Britton Chance in his study of biological materials such as muscles, cell suspensions and debris of living animals. For this purpose he developed a dual wavelength instrument with two separate monochromators which were set to pass different beams of radiation through the specimen, one beam corresponding to an absorption peak of the specimen and the other beam corresponding to a wave length at which the specimen has little absorption, or to an isobestic point of the system under study. Tandler, Grossman and Tourin in U.S. Pat. No. 2,844,730 described an instrument suitable for dual wavelength operation, including its optical and electronic equipment.

More recently a technique has been developed involving split beams. Two specimens are set up side by side and the two diffraction gratings of a duochromator are adjusted to give beams of identical wavelength, one of which is passed through one specimen and the other through the other specimen. The diffraction gratings are then moved in unison to spectrally scan the two specimens. An instrument having this capability is described in detail with its optical and electronic system by Robert Rikmenspoel, Sensitive Absorption Spectrophotometer for Use as a Split Beam or as a Dual Wavelength Instrument, 36 Review of Scientific Instruments 497 (April 1965).

Both the dual wavelength and the split beam methods of operation produce sensitive indications. In a sample of enzyme suspension which has an optical density of two to three optical density units, existing instruments are capable of detecting a change of 0.002 and in some cases 0.0002 optical density units. The scanning mode, however, produces relatively undefined shoulders in the absorption curve, so that it requires considerable skill and persistence by the operator to interpret small spectral details which may be meaningful.

The spectral scanning mode of operation of the spectrophotometer required the use of a reference cuvette as well as a specimen cuvette. In some cases spectral scanning was hindered because no suitable reference could be found.

The present invention is concerned particularly with accentuating of shoulders or humps in the curve produced by a spectrophotometer to create striking peaks which will clearly emphasize such points of inflection. This is done by modifying the operation of the spectrophotometer to make it read a first derivative of its two variables, such as absorbance (or emission) with respect to wavelength, which serves to accentuate the effect of changes in the shape of the spectrum.

In order to accomplish the mode of operation of the invention, it is necessary to depart from features which are characteristic both of the dual wavelength method and of the split beam method.

Unlike the split beam method, but like the dual wavelength method, I use a single specimen through which two beams are passed in time sequential relation so as to create two inpulses which can be compared.

Since only a single specimen is being used, but spectral scanning of that specimen is being employed, it is no longer necessary to have a reference, since the specimen itself scanned by radiation at a slightly different wavelength provides its own reference. It is a distinct feature of the present invention that the single cuvette or specimen is scanned with slightly different wavelengths of radiation.

Unlike the split beam method, I employ different wavelengths of light on the two beams. Unlike the dual wavelength method, which sets the two wavelengths to correspond with absorption peaks and wavelengths where little absorption occurs in the specimen or at isobestic points, I dispose the two diffraction gratings at a very small angle to one another, between 0.1 and 10 millimicrons and preferably about 2 millimicrons, as measured in the difference in wavelength of emitted light.

Unlike the dual wavelength method, I scan a single specimen with the two wavelengths.

It should be kept in mind that in spectrophotometry, particularly of the absorption type, many specimens include particles which reflect or refract light. The light does not travel straight across in the direction of the photomultiplier, but undergoes zig-zag travel from one particle to another. An important influence, therefore, in light transmission through such specimens is the length of the light path through the specimen. In the present invention, both light beams must have generally the same light path in passing through the common specimen.

In a spectrophotometer according to the invention, it is very desirable to have dual wavelength capability, split beam capability, and first derivative capability according to the present invention, using the same electronic measuring technique, so that errors in the measuring system will largely be eliminated in shifting from one mode of operation to another.

One optical system of a device of the invention as shown in FIGS. 1 and 2 represents a development of the optical system as shown in the Rikmanspoel article above referred to. A polychromatic source of light such as a ribbon filament electric lamp 20 in FIG. 1 passes light through a mask 21 having two separate openings which splits it into two beams 22 and 23, one of which is shown in section and the other of which is shown in outline in order to distinguish one from the other. Condensing lenses 24 and 25, suitably of quartz, focus the light on duochromator entrance slit 26, direction being changed by mirror 27. The beams are interrupted by rotating chopper 28 rotated by synchronous motor 30 suitably driven from a 60 cycle alternating current source, and being of the character well known in the art which has positive indexing to the phase of the A.C. power line (Kollsman Motor Company, Dublin, Pennsylvania). This provides two alternating pulses of light at 60 cycles per second, the chopper (FIG. 2) conveniently being a plate having a rim 31 approximately one-half of the circumference which allows light to pass around it, and an arcuate slit 32 over the other half of the circumference which corresponds to an obstructing portion 33 of the rim. Two windows of the mask 21 are shown aligned with the interrupter to illustrate that two beams are formed which do not overlap and are slightly separated.

A beam equalizer 34 of well known type is interposed in the light beams to permit equalizing the beams so that an initial condition suitably of balance can be attained.

A duochromator 35 which is broadly of well known character receives light through an entering field lens 36, suitably also of quartz, in front of the slit 26, and projects it to a concave mirror 37 by which the separate beams of light 22 and 23 are collimated onto two separate reflecting plane diffraction gratings 38 and 40, one for each beam, the gratings being of the type used in a Czerny-Turner monochromator, conveniently about 600 lines per millimeter as produced by Bausch and Lomb, Inc. and blazed for 500 millimicrons in the first order, in the preferred embodiment.

From the diffraction gratings collimated monochromatic beams are reflected by concave mirror 41 and concentrated as they leave the exit slit 42 of the duochromator on field lens 43. The beams are then reflected by two mirrors 44 and 45 which are so angularly disposed to one another that both beams pass through a single specimen 46, which may for example be in a suitable cuvette, to be received in time sequential relation on a photomultiplier 47.

It will be evident that the specimen need not be a liquid, and need not be in a cuvette. For example, the specimen may be a section of muscle, tissue, or of a particular organ of an animal body, which is under study, or it may be a powder between glass plates or a stretched film, layer or lamination. The specimen may be at room temperature or maintained very high or very low temperature.

Grating 38 is pivoted on a fixed pivotal axis 48 and has rigidly mounted to the grating a follower support 50 provided with a follower roller 51 and a bracket extension 52 behind the other grating 40. The other grating 40 is pivoted on the same pivotal axis 48 and is angularly adjustable with respect to the grating 38, a micrometer screw 53 passing through the bracket extension 52 and engaging the back of the diffraction grating 40. A spring abutment 54 on the housing of duochromator 57 anchors one end of a helical tension spring 55, the other end of which is connected to grating 38 to bias the grating 38 and its associated follower in a counterclockwise direction about the pivotal axis 48.

A helical tension spring 56 acts from the other grating 40 to the housing of duochromator 57 to bias the other grating 40 in a counterclockwise direction.

A lead screw 58 mounted on suitable bearings not shown is driven by a wavelength drive motor 60 through speed reduction gearing 61. Threaded on the lead screw 58 is a main lead nut 62 held against rotation by means not shown and pushing or relaxing follower roller 51 depending on the direction of rotation of the motor. A suitable counter 63 is connected by gearing 64 to the lead screw 58.

For use in other modes of operation there is an auxiliary lead screw 58' driven by the drive motor 60 through reduction gearing 61, and carrying an auxiliary follower nut 62' which cooperates with an auxiliary follower roller 51' on a follower extension 65 from grating 40. The auxiliary lead screw is interconnected through gearing 64' to a suitable counter 63' which indicates the position of the nut 62'.

It will be evident that in providing for first derivative operation according to the present invention, the micrometer screw 53 is turned so that the light from the two beams passing through the specimen differs in a wavelength between 0.1 and 10 millimicrons and preferably about 2 millimicrons, and then both gratings are caused to rotate together and this in effect causes spectral scanning by driving the lead screw 58 by the wavelength drive motor 60. If desired, the lead screw could be turned by hand to cause scanning, although the speed would be less uniform. A precision potentiometer 67 to be described is intergeared with the lead screw 58 by gearing 68 and it travels back and forth across its resistor in proportion to the motion of the follower nut 62 and is capable of determining the X axis bias voltage for the XY recorder to be described.

The instrument in the preferred embodiment has a wavelength accuracy of about 1 millimicron, has a reciprocal dispersion of 6.60 millimicrons per millimeter, has scattered light less than 0.1% and has an aperture for each beam of F8 and a total effective aperture of F4.

Considering now the diagram of the circuit shown in FIG. 3, the photomultiplier tube has an anode 90, a cathode 91 and a series of dynodes 92 (11 dynodes are normally used and only two are shown). The cathode is energized at 1000 volts or less D.C. depending on the dynode feedback circuit 75, through a protecting resistor 93. Each of the dynodes is connected to ground in a circuit including independent biasing resistors 94, one between each dynode and the next and connected in series to ground as shown.

The signal generated by anode 90 passes to fixed contact 72 of synchronous electric switch 71 driven by the alternating current suitably at 60 cycles, and is connected to ground through load resistor 95 bypassed to ground by noise suppressing capacitor 96. The fixed contact 74 of the synchronous switch 71 is connected to a standard reference voltage suitably at 0.5 volt D.C. For a short interval at the end of each measure pulse and reference pulse, the fixed contacts of the synchronous electric switch 71 are preferably shorted out by means well known in commercial synchronous switches so as to eliminate the tendency to form peaks between the meaningful pulses.

The reference circuit 97 receives its input from movable contact 70, either from the reference source or the photomultiplier tube anode, through coupling capacitor 98 to the positive side of the input of amplifier 100. The minus side of the input of amplifier 100 is grounded through resistor 101 and also connected by resistor 102 to the output side of amplifier 100. A demodulating synchronous electric switch 103 driven by the alternating current source suitably at 60 cycles has a movable contact 104, a fixed contact 105 and a fixed contact 106. Interposed between the output of amplifier 100 and the movable contact 104 of demodulating synchronous switch 103 is placed a series resistor 107 and a series capacitor 108.

The demodulating synchronous switch 103 has its fixed contacts 105 and 106 shunted by capacitor 109 which assists in storage of energy. The reference circuit pulse passes from fixed contact 105 to the dynode feedback circuit 75 which includes a series pass vacuum tube 110 having an anode, a cathode, a control grid and a screen grid. The signal to the control grid is attenuated through a coupling resistor 111. The cathode is grounded and the screen grid is connected to ground through interposing Zener diode 112. The screen grid is energized suitably at +125 volts through a dropping resistor 113. The anode is connected to the positive side of a standard 1000 volt D.C. source 114, the negative side of which is connected through resistor 93 to the cathode of the photomultiplier tube 47 to first resistor 94 of the series connected to the dynodes, and also through variable coupling resistor 115 and series capacitor 116 to the control grid, these latter elements preventing oscillation. The connection from the negative side of the 1000 volt source to the cathode of the photomultiplier tube provides feedback so as to vary the high voltage on the photomultiplier tube in response to the reference impulse coming from the synchronous switch 103 during the time the reference light beam is passing to the photomultiplier tube. This in effect varies the gain an the photomultiplier.

A measure circuit 117 includes an amplifier 68, the positive input side of which is connected to contact 72 of synchronous switch 71 through coupling capacitor 118. The negative input to the amplifier 68 is grounded through biasing resistor 119 and the negative input side is also connected to the output through gain adjusting variable resistor 119'. The output from amplifier 68 is connected through phase sensitive synchronous switch 120 operating preferable at 60 cycles, by means of series resistor 121 and series capacitor 122 which prevent feedback. This connects to the movable contact 123 of synchronous switch 120, fixed contact 124 being grounded and fixed contact 125 connecting through limiting resistor 126 to output terminal 127. There is a movable contact 128 connected to the output terminal which is capable of connection to any of a group if separate different capacitor branches 130 connected to ground and capable of smoothing the signal.

Figure 4:
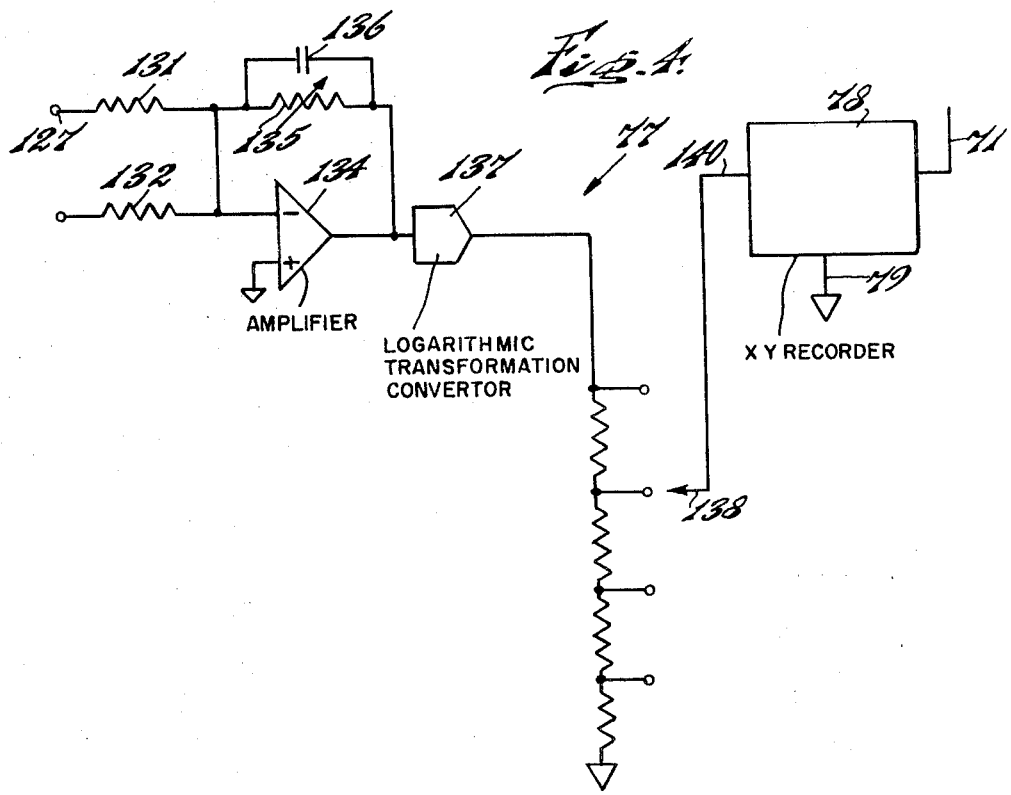
FIG. 4 is an electrical circuit diagram showing an optical density conversion means which may be employed in the invention.

FIG. 4 illustrates the circuit for logarithmic transformation converter device 77 which is conveniently of a commercial type, for example the Burr Brown converter. Terminal 127 is connected to resistor 131. Resistor 132 is energized at one side as a slightly higher positive voltage than the voltage imposed on resistor 131. The output sides of both resistors are connected together and to the negative input on amplifier 134, the positive input side of which is grounded. The negative input side of amplifier 134 is also connected to one side of an oscillation preventing loop consisting of a variable resistor 135 and a shunting capacitor 136. The opposite side of the loop is connected to the output of the amplifier which enters the input side of logarithmic transformation converter 137. The output of the logarithmic transformation converter 137 connects to one side of attenuator sensitivity switch 138 which has a number of series connected resistors connected at the opposite end to ground and capable of varying the sensitivity of output 140 which passes to the Y axis control of the XY recorder 78, one terminal 79 of which is grounded.

The X axis is controlled by potentiometer 67 shown in FIG. 5, which scans back and forth across potentiometer resistor 68 connected at its extremities to a suitable D.C. source 70 and connected between one extremity and its movable contact 71 (moved by a lead screw and nut, not shown, as well known) to the X axis of the recorder, as well known in the art.

In operation, considering FIG. 3, the output from photomultiplier tube 47 goes to one arm of a phase sensitive synchronous electrical switch 71 which responds to the 60 cycle alternating current source. A contact 74 of switch 71 is connected to a suitable reference voltage, for example one-half volt. The moving contact of switch 71, therefore, compares the photomultiplier signal to the reference voltage and supplies this information to amplifier 100 where it is suitably amplified and demodulated to a corresponding direct current signal which is applied to the control grid of the series pass tube 110 thereby determining the high voltage and hence the gain of the photomultiplier tube.

The photomultiplier tube 47 provides output which passes through an amplifier 68. This amplifier output feeds the moving contact 123 of phase sensitive synchronous electrical switch 120 which responds to the 60 cycle alternating current source. The output signal from phase sensitive switch 120 goes to a capacitor storage device. This circuit performs the function of giving a D.C. difference signal in direct proportion to the difference of the reference pulse versus the measure pulse.

The output signal from this difference computer passes through a logarithmic transformation converter 77 (FIG. 4) which converts the signal to optical density and produces a signal which controls the Y axis of the XY recorder 78.

It will be evident that a wide variation in design of electronic circuits can be employed. Merely in order to give an example of one suitable embodiment for the purposes of the invention, the following parameters for various components are noted.

Photomultiplier tube 47—E.M.I. 9558C
Protecting resistor 93—100K[1]
Biasing resistors 94—0.68 meg.[2]
Load resistor 95—220K
Noise suppressing capacitor 96—750 mmf.
Coupling capacitor 98—0.47 microfarads
Resistor 101—2K
Resistor 102—200K
Series resistor 107—10K
Series capacitor 108—1 microfarad
Capacitor 109—1 microfarad
Series pass vacuum tube 110—6DQ5
Coupling resistor 111—100K
Zener diode 112—IN965B
Dropping resistor 113—10K
Variable coupling resistor 115—1 meg.
Series capacitor 116—0.01 microfarad
Coupling capacitor 118—0.58 microfarad
Biasing resistor 119—2K
Variable resistor 119'—5K
Series resistor 121—1K
Series capacitor 122—1 microfarad
Limiting resistor 126—2K
Capacitors 130— 0.1 to 10 microfarad
Resistor 131—1 meg.
Resistor 132—1 meg.
Variable resistor 135—900K
Capacitor 136—0.01 mmf.

[1] K=1000 ohms.
[2] Meg.=megohm.

The embodiment previously described in detail is typical of an absorption spectrophotometer operating according to the mode of the present invention. FIG. 6 illustrates an emission spectrophotometer, suitably a spectrophotofluorometer, the right hand or absorption portion of which to and including the sample may suitably conform to the optical diagram of FIG. 1, while the left hand or emission portion will follow the principles of existing emission spectrophotometers except for the mode of operation according to the present invention.

Much detail similar to FIG. 1 has been omitted from both sides of FIG. 6 to simplify the showing. It will be evident that FIG. 6 is intended to include features similar to FIG. 1 which are omitted.

By disposing the gratings 38 and 40 on the absorption side of the device in the manner previously described and rotating them, spectral scanning of the specimen 46 by two slightly different (0.1 to 10 and preferably 2 millimicrons) beams of radiation takes place, the direct beams passing through a lens 49 and suitably being absorbed in a light absorber 160. Secondary radiation (luminescence) beams 161 and 162 are conveniently taken off at right angles though the entering slit 163 and field lens 163' of a suitable duochromator 164 which can conveniently be as already described and in which various components are being omitted for convenience. The beams 161 and 162 are collimated by a mirror 165 to diffration gratings 38' and 40' which are initially set for the same wave length but can be oriented with rsepect to one another in the manner already described for first derivative mode of operation. From the diffraction grating two monochromatic beams are emitted and these are reflected by mirror 166 to pass through exit slit 167 and field lens 167' to angulating mirrors 168 and 170, which project the beams to the photomultiplier 47 for evaluation by electronic components which can suitably be the same as those already described.

In operation of the device of FIG. 6, there are two phases, in one of which the gratings of one of the duochromators are set at a slightly different wavelength (0.1 to 10 and preferably about 2 millimicrons), and the gratings of the other duochromator are set at the same wavelength and at a predetermined wavelength at which emission is obtained and remain stationary. Then the gratings which are set at different wavelengths are rotated to scan.

In normal practice the gratings for the emission duochromator of the invention are set at the same wavelength and a preselected wavelength, and the gratings of the absorption duochromator are set at the slightly different wavelength, as already described, and rotated to spectrally scan the sample. Next, the gratings of the absorption duochromator are set for the same wavelength and at a preselected wavelength and are kept fixed, while the gratings for the emission duochromator are set for the slightly different wavelength, as already described, and rotated to spectrally scan the emission. Thus, in each case by the mode of opeartion just described, a first derivative of the curve of absorption versus wavelength, or the curve of emission versus wavelength, is obtained according to the present invention.

In order to illustrate the utility of the device of the invention, as applied to spectrophotometry, the substance which is considered as a standard in enzyme kinetics, namely, cytochrome C, was examined in the instrument.

Figure 8:
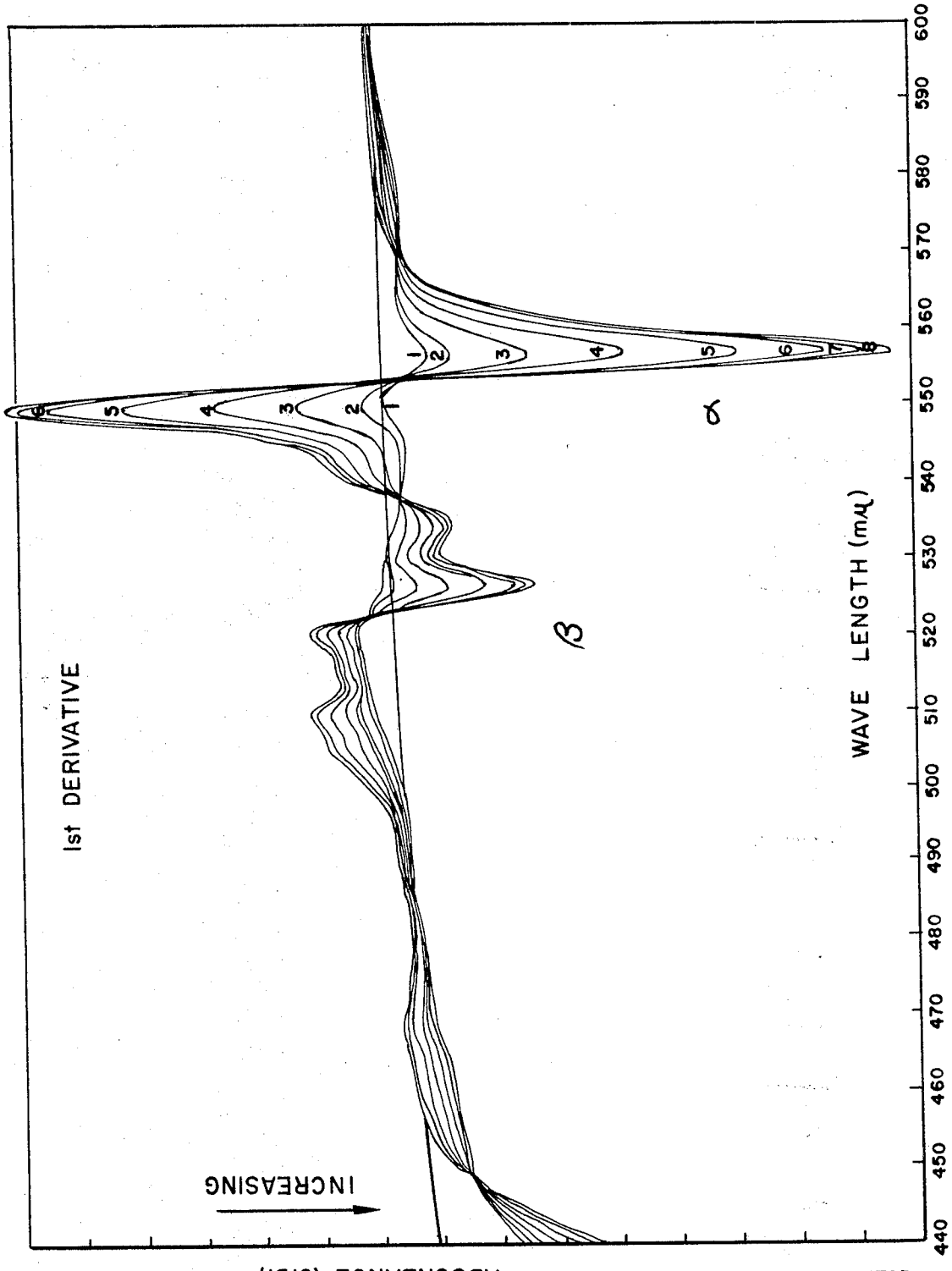
FIG. 8 is a family of curves for the same specimens shown in FIG. 7, for the same incremental reduction, starting with curve 1 which is the oxidized form, but using the technique of the present invention to produce the first derivative of the absorbance with respect to the wavelength.

FIGS. 7 and 8 represent curves of absorbance in optical density units as ordinate (increasing as you descend) against wavelength in millimicrons. In both cases the same specimen of cytochrome C is employed in an initial oxidized condition (curve 1) and in step-by-step reduction corresponding to curves 2 to 8 inclusive. In FIG. 7 the split beam mode of operation was used and the separate beams were passed through different samples, one for the reference and one for the test sample.

FIG. 8 shows the results obtained from the identical single sample, which provided its own reference according to the present invention.

In comparing the spilt beam spectra with the first derivative spectra it may be seen that the symmetrical alpha peak of the split beam spectra gives a sharp up-and-down deflection at this point in the first derivative spectra. On the other hand, the beta peak of the split beam spectra which is non-symmerical appears in the first derivative spectra as multitudinous small peaks which are clearly distinguishable.

In previous evaluation of split beam spectra, the alpha peak has been somewhat delineated, and it has been conjectured that the beta peak comprises a complex of small peaks. By the present invention the alpha peak is sharply demonstrated and the beta peak is for the first time resolved into components.

Figure 9:
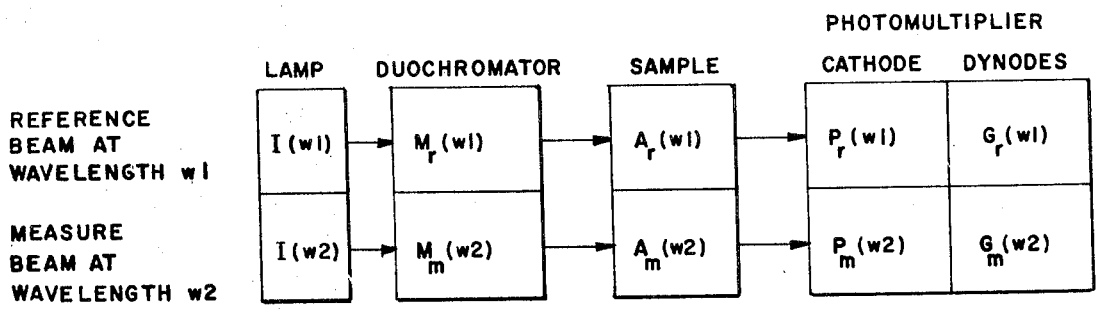
FIG. 9 is a block diagram of mathematical functions involved in the invention.

In order to understand the mathematical significance of the mode of operation according to the invention, it will be helpful to refer to FIG. 9, which shows by block diagram the various parameters which have to be dealt with or corrected for.

The flow diagram of FIG. 9 indicates wavelength dependent instrument component parameters in relative order of occurrence and which are defined as follows:

I=lamp intensity (photons/sec.)
M=monochromator efficiency (ratio of monochromatic light at exit to that at entrance)
A=absorbance of sample (O.D. units)
P=photomultiplier cathode response (electrons/photon)
G=amplification factor of photomultiplier tube
q=amp.sec./electron
w1=wavelength of reference light
w2=wavelength of measure light=w1+Δw.

The total current $i_r$ (amperes) in the reference channel of wavelength $w$ is given by Equation 1.

(1) $$i_r = I_r(w1) \cdot M_r(w1) \cdot A_r(w1) \cdot P_r(w1) \cdot G_r(w1) \cdot \frac{1}{q}$$

Similarly Equation 2 gives total current (amperes) in the measure channel at slightly different wavelength ($w2$).

(2) $$i_m = I_m(w2) \cdot M_m(w2) \cdot A_m(w2) \cdot P_m(w2) \cdot G_m(w2) \cdot \frac{1}{q}$$

The dynode feedback circuit maintains $G_r = G_m$ at all times. Solving for $G_r$ in Equation 1 and substituting in Equation 2 gives Equation 3.

(3) $$i_m = i_r \frac{I_m(w1) \cdot M_m(w1) \cdot A_m(w1) \cdot P_m(w1)}{I_r(w2) \cdot M_r(w2) \cdot A_r(w2) \cdot P_r(w2)}$$

A condition is applied to Equation 3 that instrument parameters I, M and P (as defined earlier) are mildly varying functions and do not have a marked effect except to cause minor baseline non-flatness. This discrepancy from baseline flatness can be evaluated by running a spectrum with no sample in the sample area. The non-flatness which is generally less than 5% can be removed using a suitable compensating circuit such as a tapped potentiometer by techniques well known to the art.

In conventional spectrophotometry $w1=w2$ and Equation 3 becomes (4) $$\frac{i_m}{i_r} = \frac{A_m}{A_r} = \frac{10^{-E_m C_m L_m}}{10^{-E_r C_r L_r}}$$

where

E=extinction coefficient of functions of $w$
C=concentration of absorbing species
L=the effective path length.

Taking log of both sides:

(5) $$\log\left(\frac{i_m}{i_r}\right) = E_r C_r L_r - E_m C_m L_m$$

since $E_r = E_m$ (both at same wave length) and $L_r = L_m$ (same path length).

(6) $$\log\left(\frac{i_m}{i_r}\right) = C_r - C_m = \Delta C$$

(7) $i_m = i_r - i_s$, that is, the measured current is equal to the reference current minus an amount of current proportional to the light absorbed by the sample.

(8) $$\log\left(\frac{i_r - i_s}{i_r}\right) = \Delta C = \log\left(1 - \frac{i_s}{i_r}\right)$$

which is the conventional relationship (Beer's law) used in spectrophotometry.

In the case of first derivative spectra, the measure and reference wave length are different, and repeating Equation 5:

(5) $$\log\left(\frac{i_m}{i_r}\right) = E_r C_r L_r - E_m C_m L_m$$

For a given concentration of absorbing material, the expression reduces to (9) $$\log\left(1 - \frac{i_r}{i_m}\right) = E_r - E_m$$

(10) Setting $E_r = E(w)$
and $E_m = E(w + \Delta w)$ $$\log\left(1 - \frac{i_r}{i_m}\right) = E(w) - E(w + \Delta w)$$

(11) Since $\log\left(1 - \frac{i_r}{i_m}\right) = $ O.D. (optical density)

(12) $\quad$ O.D. $= E(w) - E(w + \Delta w)$

(13) $\quad$ or O.D. $= \Delta w \dfrac{dE(w)}{dw}$ $\Delta w \to 0$

In view of my invention and disclosure variations and modifications to meet individual whim or particular need will doubtless become evident to others skilled in the art to obtain all or port of the benefits of my invention without copying the process and apparatus shown, and I, therefore, claim all such insofar as they fall within the reasonable spirit and scope of my claims.

Having thus described my invention what I claim as new and desire to secure by Letters Patent is:

1. A process of generating absorption spectra corresponding to the first derivative of absorbance with respect to wave length of a specimen subjected to transmitted optical radiation in a spectrophotometer having a duochromator provided with a pair reflecting diffraction gratings, which comprises generating two time sequentially displaced polychromatic radiation beams, introducing these beams into the duochromator and there collimating them, reflecting the beams one from each diffraction grating and condensing them, passing both beams from the duochromator through the same specimen in generally the same light path, equalizing the beams, adjusting the angles of the diffraction gratings so that they are sending through the single specimen light differing in wave length between 0.1 and 10 millimicrons, moving the diffraction gratings while maintaining the same angular relationship between them to scan the specimen with both light beams, generating time sequentially displaced electrical impulses corresponding to the radiation transmitted through the specimen by the respective beams, amplifying the electrical impulses, comparing the electrical impulses with one another, and thus producing a difference impulse and adjusting the difference impulse by varying the sensitivity in generating the time sequentially displaced electrical impulses and thus obtaining a ratio measurement between a reference impulse and a measure impulse, said ratio being a function of the optical density of the specimen.

2. A process of claim 1, which comprises precisely adjusting the angular relationship between the diffraction gratings so that the difference in wave length of radiation passing through the specimen is approximately 2 millimicrons.

3. A spectrophotometer having a source of polychromatic optical radiation, optical means for producing two time sequentially displaced polychromatic beams from the source, means for selectively alternating either of the two beams, duochromator receiving, collimating, rendering monochromatic and condensing radiation from the beams and including a pair of reflecting diffraction gratings one of which reflects each beam, means for passing both beams of radiation from the duochromator through a single specimen in generally the same light path, a single photomultiplier means responsive to the radiation transmitted through the specimen at any particular time, measuring means which responds to radiation received by the photomultiplier means at any particular time and generates a pulse corresponding to the difference between two time sequentially displaced pulses corresponding to the different beams, the measuring means including feedback means for successively rapidly adjusting the sensitivity of the photomultiplier means in response to the intensity of one of the radiation beams which functions as a reference beam, means for creating an output pulse which corresponds to a logarithmic function of the difference pulse produced, means for disposing the two diffraction gratings at an angle at which the monochromatic beams passing through the specimen in generally the same light path differ in wave length between 0.1 and 10 millimicrons, and means for moving the diffraction gratings in unison while retaining the above angular relation to scan the specimen with both beams.

4. A spectrophotometer of claim 3, in which the two diffraction gratings are disposed at an angle at which the monochromatic beams passing through the specimen differ in wavelength by 2 millimicrons.

References Cited

UNITED STATES PATENTS

| | | | |
|---|---|---|---|
| 3,211,051 | 10/1965 | Frei et al. | 356—97 |
| 2,474,098 | 6/1949 | Dimmick. | |
| 2,971,429 | 2/1961 | Howerton. | |
| 2,984,146 | 5/1961 | Kwart et al. | |

OTHER REFERENCES

Gunders et al.: "Comparative Analysis of Derivative Spectrophotometric Methods," Journal of the Optical Society of America, vol. 55, No. 9, September 1965, pages 1094–1097.

Chance: "Rapid and Sensitive Spectrophotometry III A Double Beam Apparatus," Review of Scientific Instruments, vol. 22, No. 8, August 1951, pages 634–639.

Rikmanspoel: "Sensitive Absorption Spectrophotometer for Use as a Split Beam or as a Dual Wavelength Instrument," Review of Scientific Instruments, vol. 36, No. 4, April 1965, pages 497–503.

F. L. EVANS, Primary Examiner

RONALD L. WIBERT, Examiner

U.S. Cl. X.R.

250—71; 356—51, 85, 95